United States Patent [19]
Egan

[11] 3,889,095
[45] June 10, 1975

[54] WORKING SURFACE FOR RADIANT ENERGY BEAM CUTTER

[75] Inventor: Georgette S. Egan, Granada Hills, Calif.

[73] Assignee: Hughes Aircraft Company, Culver City, Calif.

[22] Filed: Mar. 8, 1973

[21] Appl. No.: 339,661

Related U.S. Application Data

[62] Division of Ser. No. 218,896, Jan. 19, 1972, Pat. No. 3,811,554.

[52] U.S. Cl............. 219/121 L; 198/131; 198/195
[51] Int. Cl............................................. B23k 27/00
[58] Field of Search ..... 198/195, 131; 219/121 LM, 219/121 L, 121 EB, 121 EM, 158; 29/283, 491, 559; 269/284, 296

[56] References Cited
UNITED STATES PATENTS

| | | |
|---|---|---|
| 1,979,871 | 11/1934 | Cruickshank.................... 198/195 X |
| 2,118,736 | 5/1938 | Odom ................................ 198/195 |
| 3,612,814 | 10/1971 | Houldcroft...................... 219/121 L |
| 3,719,141 | 3/1973 | Jaffa et al. ...................... 198/131 X |
| 3,828,159 | 8/1974 | Zoor............................ 219/121 LM |

*Primary Examiner*—C. L. Albritton
*Assistant Examiner*—G. R. Peterson
*Attorney, Agent, or Firm*—Joseph E. Szabo; William H. MacAllister, Jr.

[57] ABSTRACT

A cutting surface for a laser cutter is formed of a plurality of slats assembled into an endless conveyor belt, or alternatively into a slidable tray, for carrying material toward and away from the cutting area. In order to prevent damaging reflection of the laser beam the slats have a honeycomb core held rigid by knife-edged support members.

1 Claim, 16 Drawing Figures

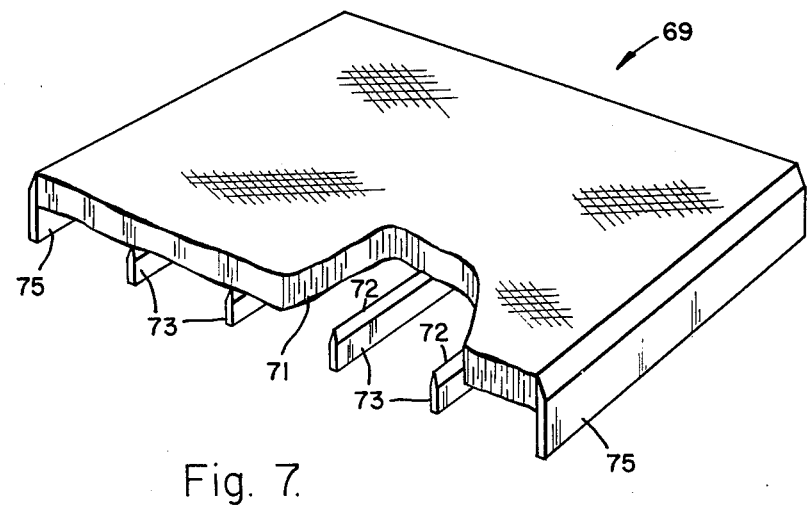
Fig. 7.
Fig. 9.
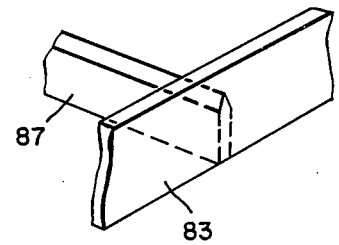
Fig. 8.
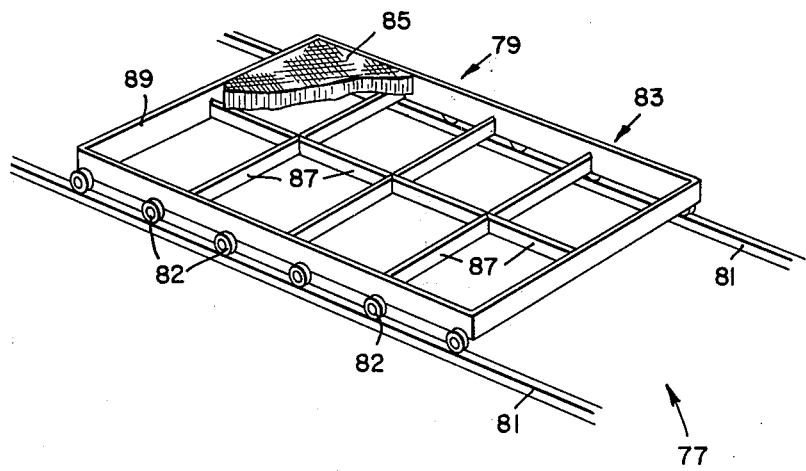

WORKING SURFACE FOR RADIANT ENERGY BEAM CUTTER

CROSS REFERENCE TO RELATED APPLICATIONS

This is a division of application Ser. No. 218,896, filed Jan. 19, 1972 now U.S. Pat. No. 3,811,554.

LASER CUTTING SURFACE, U.S. Pat. No. 3,828,159 discloses a honeycomb surface for supporting material being cut by a laser beam without reflecting the beam back at the material.

U.S. Pat. No. 3,696,230 on a LASER LENS COOLING SYSTEM discloses a system wherein a stream of gas is used to cool a laser beam focusing lens and also for controlling combustion of the material being cut.

A system whereby a laser beam is movable on a selected surface without moving the beam's source is the subject of application Ser. No. 219,020, now abandoned, filed by Robert M. Zoot and Douglas W. Wilson on a LASER CUTTER OPTICAL SYSTEM on Jan. 19, 1972.

MATERIAL HOLDING AND SMOKE REMOVAL SYSTEM FOR A LASER CUTTER, U.S. Pat. No. 3,696,230, discloses a system for both holding in place fabric being cut and for removal of combustion byproducts from the cutting area both above and below the cloth.

CONVEYOR ADVANCING SYSTEM, U.S. Pat. No. 3,764,775 discloses a system for compensating positioning errors in a conveyor upon which material to be cut may be carried.

A system for controlling combustion of material being cut by a laser beam and for keeping debris out of a laser focusing system is the subject of U.S. Pat. No. 3,742,183, ENVIRONMENTAL CONTROL AT LASER CUTTING POINT.

TENSION FREE CLOTH DISPENSING APPARATUS, U.S. Pat. No. 3,755,861 discloses a system for dispensing fabric from a roll onto a conveyor without stretching the fabric.

MATERIAL CUTTING AND PRINTING SYSTEM, U.S. Pat. No. 3,761,675, discloses and claims a system of which the present invention may form a component part.

A particularly advantageous method of allocating work to cutters used in the Considine et al system is separately claimed in WORKLOAD ALLOCATION FOR ONE OR MORE TOOLS, U.S. Pat. No. 3,769,488. All of the foregoing are incorporated herein by reference.

The present invention relates in general to the provision of a surface for transporting and supporting a workpiece which is to be cut by a focused high energy beam. More particularly, the invention is directed primarily to a movable work surface, such as a conveyor belt or a slidable tray, which serves both to transport material to and from a radiant energy beam cutter and to support the material while it is being cut by the beam. However, the invention may also be applied to advantage in a stationary working surface.

In answer to a long existing need for increased automation in the garment industry, a new concept for cutting cloth was introduced at Hughes Aircraft Company, assignee of the present invention. In accordance with this concept, patterns are cut out of a single ("one-high") layer of cloth on a cutting surface by a rapidly moving computer controlled laser beam. This is in radical contrast to previously existing methods whereby a given pattern was cut simultaneously through a many-layered cloth stack by conventional cutting means guided manually along wooden forms layed on top of the stack.

A serious obstacle in the implementation of the above "one-high" concept was the tendency of the focused laser beam to damage the cutting surface upon which the cloth was to rest and also to damage the cloth due to beam reflection from the cutting surface. This problem was solved by using an open heat conductive honeycomb structure for the support surface, the relatively thin but deep walls of the honeycomb functioning as a heat sink to dissipate the heat generated at its surface, while permitting most of the focused cutting beam to travel through the openings between the walls so as to minimize both the amount of heat generated at its surface, and reflections from that surface into the beam focusing and generating equipment. The invention which led to the above solution is described and claimed in patent application, Ser. No. 3,665, filed by Robert M. Zoot on Jan. 19, 1970, on a LASER CUTTING SURFACE and assigned to the assignee of the present invention. In the referenced application the cutting surface is described as a table which may be either stationary or movable. The present invention is directed primarily to the provision of a movable cutting surface, either in the form of a conveyor belt or a movable tray suitable for use with a high energy focused beam cutter. However, the invention will also be found useful with stationary support surfaces designed for such applications.

A general object of the present invention is to provide a support structure for honeycomb cores which is substantially as able to withstand damage from a focused laser beam as is the core itself, thus permitting the support structure to be located within the cutting area of the beam at, or nearly at, the same height as the core.

One of the specific objects of the invention is to provide a conveyor which serves both to transport material to and from the cutting area of a laser beam cutter and to support the material under the laser beam during the cutting operation. It is therefore a related object of the invention to provide a conveyor belt which is flexible enough to be formed into a loop and yet capable of forming a working surface under the laser beam without either sustaining damage therefrom or reflecting the beam, thereby damaging the material which is to be cut and injuring nearby personnel.

A related object of the present invention is to dispense material such as fabric from a roll onto an elongate work support surface without moving the roll laterally.

Another related object of the invention is to provide for a conveyor belt of the above type, a slat which is long and narrow so as to result in a wide yet flexible belt, which in spite of its length is structurally rigid along its length so that the belt will not deflect so much across its width as to allow the material thereon to drop out of the focused laser beam, and which in spite of its structural rigidity is still free of excessively large surfaces along its top which might interfere with the operation of the cutting beam.

It is another specific object of the present invention to provide a large yet rigid slidable honeycomb tray, upon which material may be laid, then slid upon the tray into the cutting area of a laser beam cutter, and then cut into a pattern while still on the tray. In this connection a related object of the present invention is to develop a system of supports for bracing the honeycomb panel so as to keep it flat, with the supports being capable of functioning under the focused beam without sustaining or causing damage.

In accordance with the invention some of the above objects are attained by a movable working surface formed of a conveyor belt comprised of a plurality of open, heat conductive, honeycomb slats. In order to achieve the desired width for the conveyor belt, each of the slats is long relative to its width and is constructed of a honeycomb core held rigid by a pair of slender support members extending along and attached to its opposite sides. Each of the support members thus runs the length of the slat and forms a structural beam to prevent it from flexing excessively along its length. Damage to these structural beams by the high energy beam, which enters the honeycomb core harmlessly is prevented by giving the structural beams a knife edge along their top, or radiation beam-facing edge. This may be achieved either by making the support members uniformly thin throughout, or by tapering them from a relatively thick base to a knife edge at their top.

Adjacent slats in the conveyor belt are so positioned as to leave a space between their respective supporting beams, thereby permitting the impinging high energy beam to pass through. Moreover, where the beams have tapered top edges, the included angle between adjacent ones of such edges is made sufficiently sharp to prevent them from reflecting the focused beam by prism action. By so selecting the included angle between the tapered ends of adjacent supporting beams, the focused beam striking one of them will be caused by successive reflections between the support surfaces to pass down through the inner-beam spaces.

Other objects of the invention are accomplished by knife-edged support members sandwiched in a heat conductive honeycomb panel. Such a panel may then be utilized either as a stationary work surface or more advantageously as the platform of a carriage which may be rolled into and out of the laser beam's cutting area.

A remaining object of the invention is achieved by mounting the material which is to be supported by the conveyor at one end thereof upon a rotatable roll and turning the roll to dispense the material therefrom at the same linear rate as the rate at which the conveyor is being advanced.

The invention will be described in greater detail by reference to the drawings in which:

FIG. 7 shows a stationary table comprised principally of a honeycomb panel supported by a plurality of knife-edged support members in accordance with the invention;

FIG. 8 is a simplified perspective view of an alternative system in which the material to be cut is carried on a roller-mounted tray;

FIG. 9 is an enlarged cross section through the table of FIG. 8, showing the shape of one of its knife-edged support members.

Figure 1:
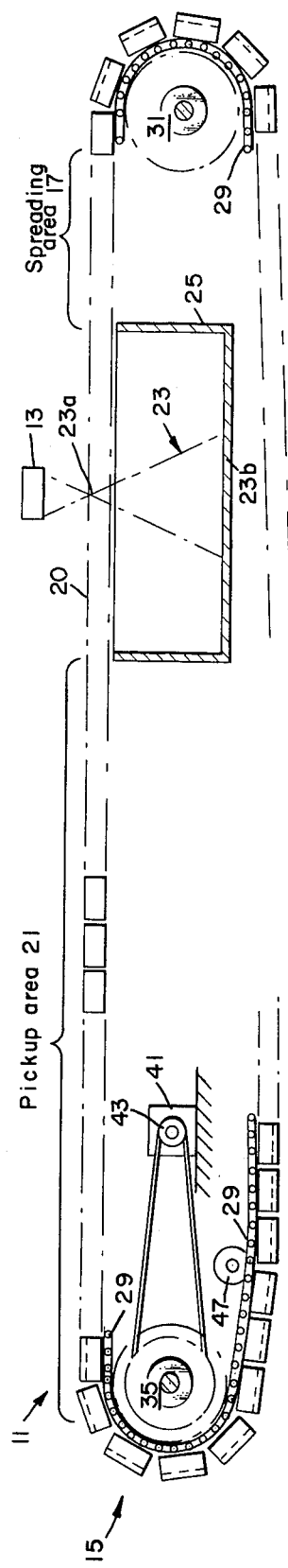
FIG. 1 is a side elevation, partly schematic, of a laser beam cutting system having a conveyor incorporating features of the present invention.
Figure 2:
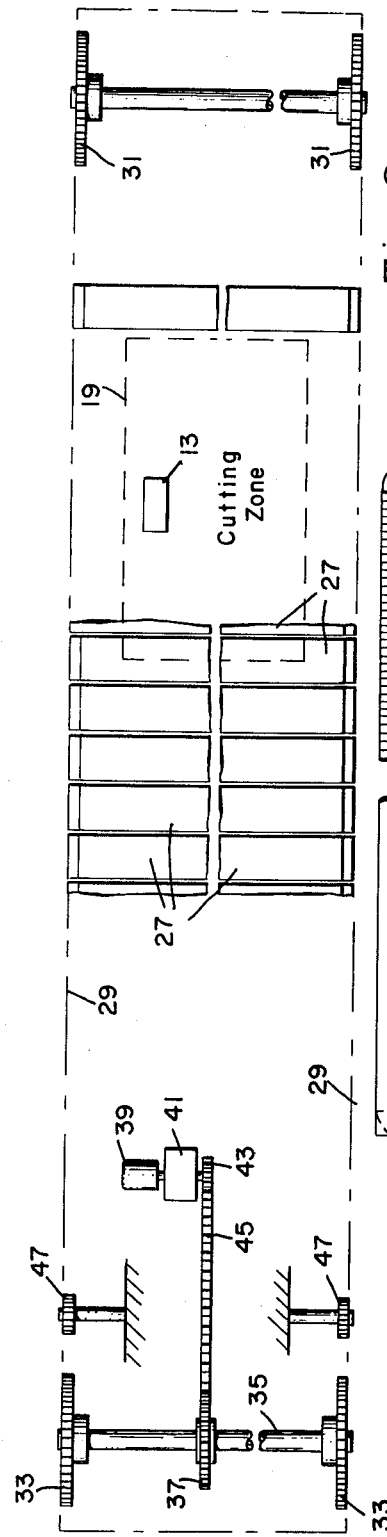
FIG. 2 is a plan view of the system illustrated in FIG. 1.

Referring now to the figures, a laser cloth cutting system 11 incorporating features of the present invention is illustrated in FIGS. 1 and 2. It is comprised principally of a focused laser beam surface 13 disposed upon a conveyor assembly 15. Moving counterclockwise, the conveyor system 15 serves to receive cloth to be cut upon a spreading area 17 from which the conveyor carries the cloth into a cutting zone 19 over which the focused laser beam source 13 is moved (by means not shown) along a predetermined path. During the cutting operation the conveyor 15 may be assumed to be stationary and following the cutting operation the system moves sufficiently to bring a new supply of material to be cut from the spreading area 17 into the cutting zone 19 and to move the cut material from the cutting zone 19 to a pick-up area 21 from which the cut material is removed either manually or by machine.

It should be understood that the overall system illustrated in FIG. 1 is not the sole invention of the present applicant and is therefore not claimed herein. It is illustrated herein only to show a preferred application of the present invention which relates to the means for supporting the material which is to be cut, shown in FIG. 1 as the conveyor assembly 15. The cutting system generally shown in FIG. 1 is the invention of Mason et al, by whom the above referenced application for MATERIAL CUTTING AND PRINTING SYSTEM is being filed.

As best seen in FIG. 1, the beam 23 which is directed at the material in the cutting zone 19 is focused so as to have its minimum cross section or waist and highest power density 23a at the working surface 20 presented by the conveyor 15. Below the working surface 20 the beam diverges and, after passing through the conveyor 15 in a manner which will be described, it is stopped by a plate 25 coated with a heat absorbing, non-reflective ablative material such as Aquadaq, a trademark of the Acheson Colloids Company. By virtue of the relatively large area 23b over which the beam strikes the plate 25, the plate is able to dissipate the energy of the beam without overheating.

Turning next to the details of the conveyor 15, it is principally comprised of a plurality of elongate rectangular slats 27 connected into an endless belt by means of a pair of chains 29. The chains 29 are supported at their opposite ends upon sprockets 31 and 33, the latter being mounted on a common drive shaft 35 driven by a motor 39 through a drive train which includes a speed reducer 41, and a pair of sprockets 43 and 37 interconnected by a chain 45 and respectively mounted on the output shaft of the speed reducer and upon the drive shaft 35. Each of the chains 29 is desirably provided with a tension adjusting vertically movable sprocket 47.

Figure 4A:
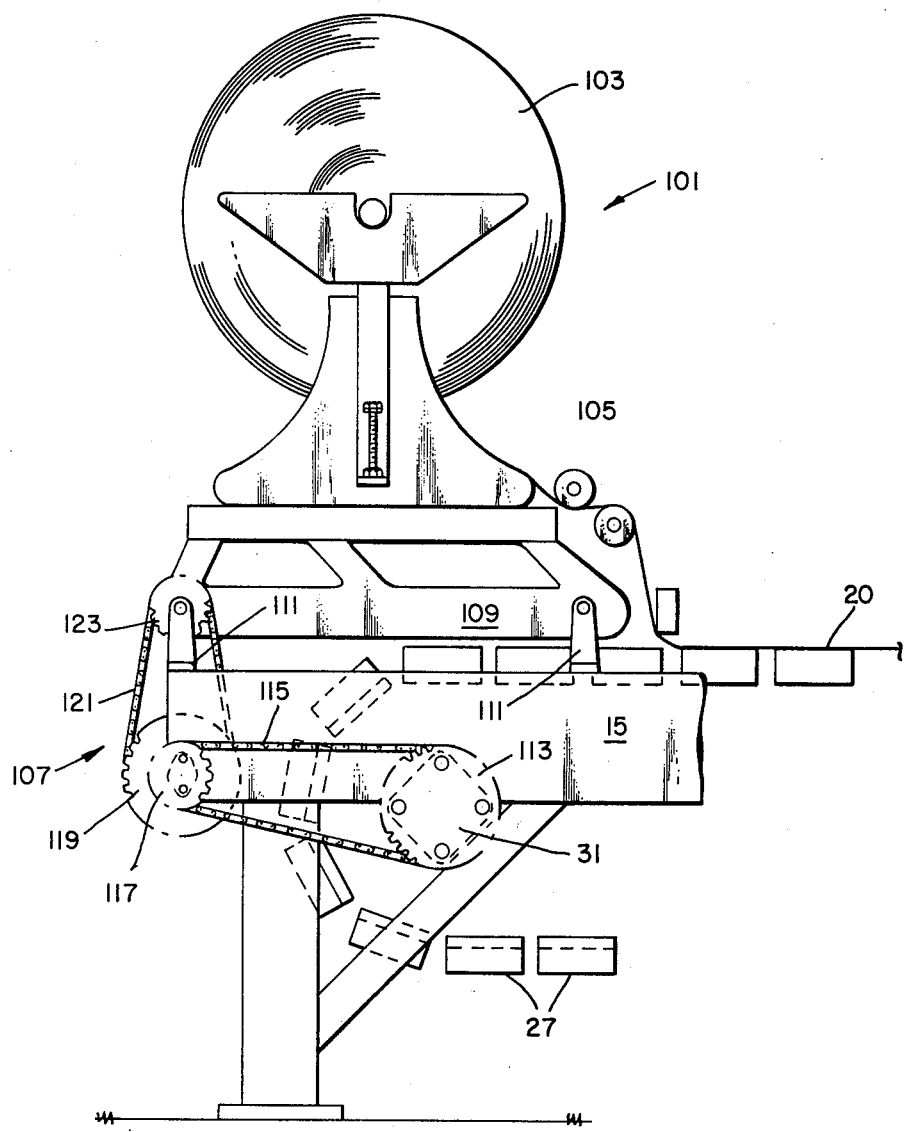
FIG. 4a is a side view of one end of the system of FIG. 1 showing a fabric spreader in addition.

In accordance with a further optional feature of the invention, means are also provided for dispensing material from a bolt onto the working surface 20 of the conveyor 15. As shown in FIG. 4a, the dispensing means includes means for rotatably supporting a bolt 103 of material 105 at the upstream end of the conveyor 15 and means for turning the bolt 103 in response to movements of the conveyor 15 at such a rate as to match the linear speed of the material dispensed from the roll to that of the conveyor.

FIG. 4a illustrates how a commerically available spreader may be modified so as to adapt it to the above dispensing mode. The CRA Champion model spreader manufactured by Cutting Room Appliances Corp., New York, New York, is normally mounted on wheels and is rolled on tracks along a stationary elongate work table to spread material along that table. A gear on the spreader rides in a rack extending along the edge of the table and turns at a rate proportional to the linear rate of travel of the spreader along the table. In accordance with the present invention, the functions of the spreader and of the working surface are reversed. The spreader remains stationary and merely dispenses material while the working surface travels and spreads the material onto itself. As shown in FIG. 4a, the spreader 101 includes a bolt 103 rotatably mounted on a frame 109. The frame is bolted on the frame of the conveyor 15 at its upstream end by brackets 111 which replace the wheels on which the spreader normally rolls.

Conveyor motion is transmitted from the sprocket shaft 31 through a gear 113, a chain 115, second and third step-up gears 117 and 119 and a second chain 121 to the speed sensing gear 123 of the spreader. As the conveyor 15 moves, the speed sensing gear 123 turns in proper proportion, as determined principally by the ratios of the gears 113, 117 and 119, so as to cause the spreader's drive mechanism to dispense material from the bolt 103 at the same linear rate as that at which the conveyor 15 is moving.

By virtue of the non-slip nature of the conveyor work surface 20, once the material reaches that surface it is carried and spread smoothly and without wrinkles by the conveyor 15 along its surface 20 from the spreader to the cutting zone 19. As an alternative to directly coupling the spreader 101 to the conveyor 15 for speed sensing purposes, a speed sensing loop may be provided, as disclosed in the above referred application for TENSION FREE CLOTH DISPENSING APPARATUS by Castro et al. The speed sensing loop takes the form of a free hanging loop in the material between the spreader 101 and the conveyor 15. Photocells sense the position of the loop and control the rotation of the bolt so as to keep the length of the loop within predetermined limits.

Figure 3:
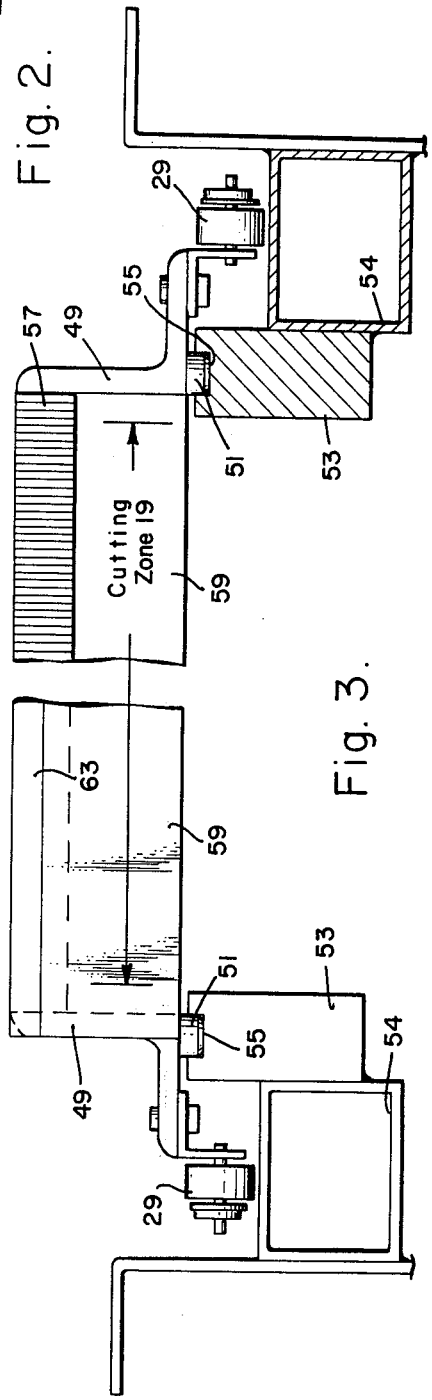
FIG. 3 is an enlarged side view, partly broken away, of a slat used in the conveyor shown in FIGS. 1 and 2.
Figure 4:
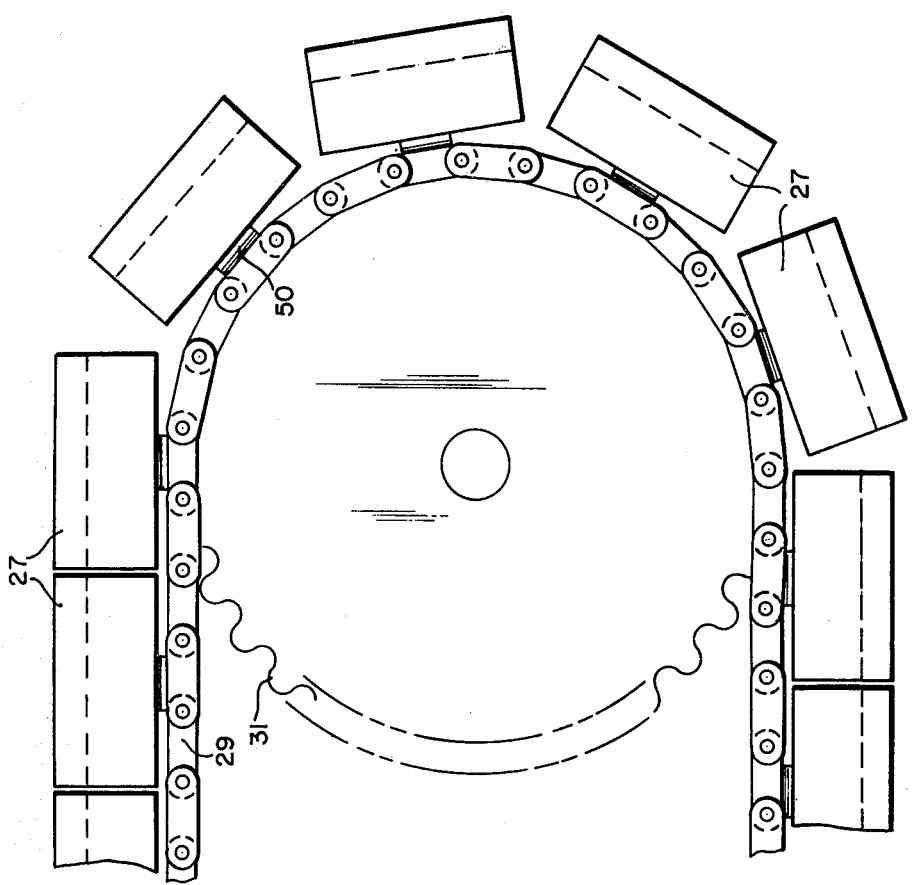
FIG. 4 is an enlarged view of a portion of the conveyor belt illustrated in FIG. 1 to show the manner in which individual slats are mounted upon an endless chain.

Because the focused laser beam moves in a plane and has a limited depth of focus, it is important to the proper operation of the laser cutting system 11 that the working surface 20 be flat. Accordingly, means are provided, at least in the vicinity of the cutting zone 19 and preferably along the entire length of the conveyor belt, to cause the belt to move along a flat plane. More specifically, as best seen in FIG. 3, each of the elongate slats 27 carries a bracket 49 at its opposite ends and each of the brackets is provided with one or more guide buttons 51 which move along slots 55 formed in a guide rail 53 extending along the respective ends of the slats 27. The guides 53 are rigidly mounted upon the frames 54 of the cloth cutting system 11.

In addition to serving as a means for guiding the slats 27 along a flat plane, the brackets 49 also serve to support the slats across the chains 29, this being accomplished by a flange 50 attached to each of the brackets 49 and to the chain 29.

In accordance with the invention, each of the slats 27 is comprised of a metal, preferably aluminum, honeycomb core in which hexagonal openings are defined by thin walls, deep walls. Suitable, though not critical, dimensions for such a core include a depth of 1 inch, a wall-to-wall distance of 0.25 inches and a wall thickness of 0.002 inches. The preferred material for the honeycomb is aluminum because of its superior heat conduction. As mentioned earlier, the use of a metal honeycomb for forming the working surface 20 makes possible the cutting of a material upon that surface by means of a laser beam which is focused at or very near to the surface without damaging it. This is due partly to the fact that the walls of the honeycomb present a very small surface to the focused beam and partly to the fact that, since the walls of the honeycomb material have a substantial depth, they are quite capable of carrying away whatever heat is absorbed by their top edges due to the beam striking them. It will therefore be apparent that so long as the criteria of good heat conductivity, small wall thickness to opening width ratio, and small wall thickness to depth ratio are met, the specific shape of the openings and the particular dimensions of the honeycomb may be altered.

In order to provide a sufficiently wide cutting zone 19, the slats must be quite long and in a laser cutting machine which has been built, their length has been nearly 6 feet. At the same time, in order to allow the slats to go around sprockets 31 and 33 of reasonably small size, they must be quite narrow compared to their length and in the exemplary slats just mentioned, this width has been 6 inches. A honeycomb core 57 of such dimension does not by itself have nearly enough rigidity to span the distance between the spaced apart chains 29 without buckling. Consequently, some means of reinforcement or support must be provided for each of the slats and this support must of necessity be exposed to the focused laser beam 23 when traversing the cutting zone 19. In accordance with the present invention, such supporting means take the form of a pair of supporting members 59 which run the length of the honeycomb core 57 and which present a knife edge 60 to the focused beam 23. By virtue of the knife edge 60, the supporting members 59 present a sufficiently small surface to the focused beam 23 to avoid sustaining any damage therefrom. To further minimize such damage, the supporting members 59 should also be made of a heat-conductive material, aluminum being again preferred. It should be understood that the phrase, "knife edge" is used herein to denote an edge which is not necessarily sharp enough to cut with, but which when viewed with the naked eye appears to be sharp and has a width which is of the order of 0.002–0.01 inches.

Figure 5:
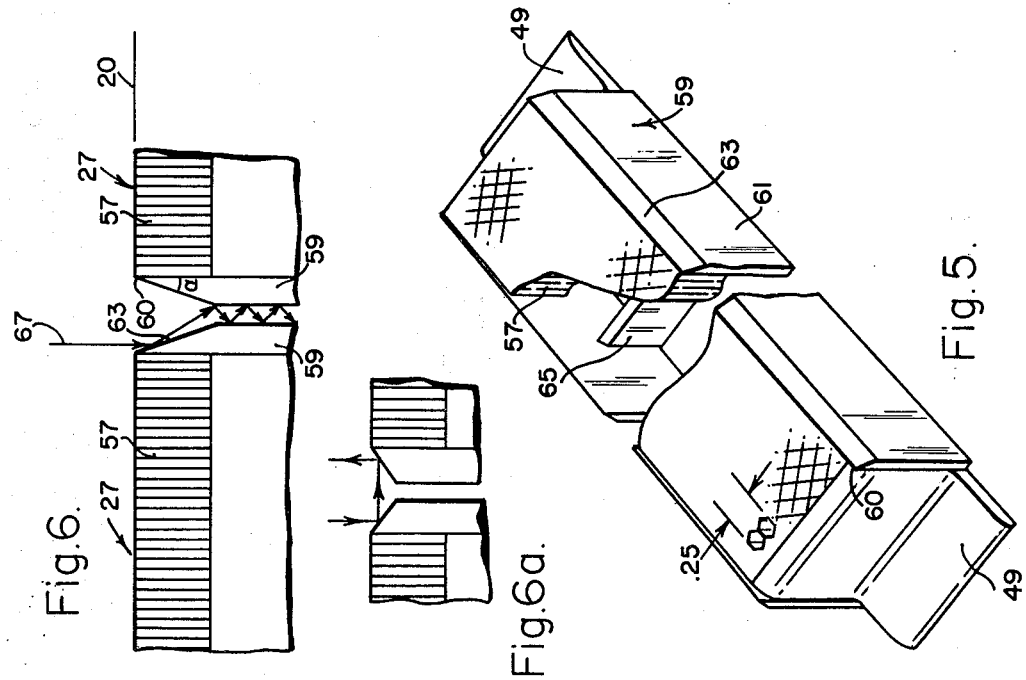
FIG. 5 is a perspective view, partially broken away, of the slat illustrated in FIG. 3.

As best seen in FIG. 5, each of the support members 59 is bonded to the edges of the honeycomb core 57 and their knife-edged top surfaces 60 are produced by means of tapered top edges 63 so that for maximum structural rigidity the bottom portion 61 of the support members 59 can be relatively thick.

If the honeycomb core 57 is sufficiently shallow relative to its width, it may have a tendency to sag or buckle across its width as well as along its length. In such a case, optional cross-support members 65, also preferably heat conductive, may be provided as shown in FIG. 5. These support members may be anchored at their opposite ends to the long support members 61 and would have knife-edged tops upon which the honeycomb core 57 would rest. Since the focused beam 23 is not as concentrated at the bottom surface of the honeycomb core 23 as it is at its top surface (see FIG. 1) a "duller" knife-edge is tolerable for the cross-support members 65 than for the longitudinal support members 59.

Figure 6:
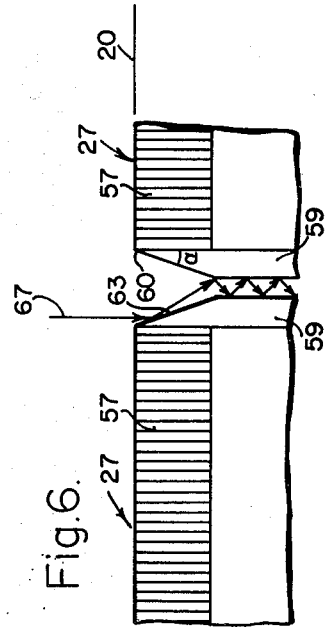
FIG. 6 is a cross section through adjacent portions of a pair of slats, illustrating how their tapered top edges prevent reflection of the laser beam back up toward the beam's source.
Figure 6A:
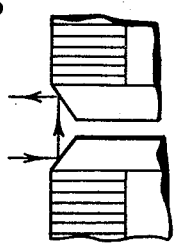
FIG. 6a is a similar cross section, illustrating beam reflection caused by an improper angle between the tapered edges of adjacent slats.

In keeping with the invention, the slats 27 are made to have a width such that a slight space exists between adjacent ones of them and more specifically between their longitudinally extending support members 59. As seen in FIG. 6, such a space permits the focused beam shown as the series of zig-zag lines 67 in FIG. 6 to pass through the conveyor belt comprised of the slats without being reflected back from them into the optical system of the laser beam source 13. Where the knife-edged top 60 is produced by means of a tapered edge 63 as shown in FIG. 6, such reflections may occur by the combined prism action of the tapered edges 63 of adjacent support members 57. More particularly, if the included angles of the adjacent tapered edges 63 are not sufficiently sharp, the incident beam 67 will bounce from one of those tapered edges across to the opposite one of the tapered edges and thence back toward the optical system of the laser beam source as shown in FIG. 6a. Accordingly, in further keeping with the invention, the included angle α between the tapered edges of adjacent ones of the support members 59 is made sufficiently sharp to prevent reflection of the beam through the surface 20 of the belt back into the laser beam source.

Application of the present invention to a stationary table 69 is illustrated in FIG. 7. It is seen to comprise a plurality of knife-edged structural members 71 sandwiched between and bonded to (see FIG. 9 at 72) a set of honeycomb panels 73. Rigidity along the length and width of the table 69 is provided by the illustrated "egg crate" configuration of the members 71 which are preferably flush with the honeycomb segments 73 at the top but which may extend below those segments at the bottom for added rigidity. Fastened around the edges of the table 71 in a manner similar to that shown in FIG. 5 are support members 75 which may be tapered to a knife edge along their tops if the entire panel 71 is to be within the cutting zone of the laser beam under which the table 69 is to be placed.

A simpler alernative to the movable work surface which is produced in FIG. 1 by the conveyor belt is illustrated in FIG. 8. It is seen to comprise a pair of tracks 81 upon which a carriage 79 is slidably disposed. The tracks 81 lead into and out of the cutting area of the laser cutting system, and the carriage 79 is moved along them on a set of rollers 82. The rollers 82 are mounted on a framework 83 which includes a grid of knife-edged support members 87 supported at their outer edges upon the framework 83. More specifically, the framework 83 includes an external frame 89 with the grid of internal knife-edged support members 87 being at a lower level than the external frame 89. However, as an alternative to the egg crate sandwich-type construction illustrated in FIG. 7 rests upon the knife-edged support members 87. The structural details whereby the knife-edged support members 87 are mounted in relation to the rollers 82 is unimportant, particularly where the honeycomb panel 85 is larger than the cutting zone, thereby excluding its edges therefrom. If that is not the case then it is important that the external frame 89 also be knife-edged along its top.

The manner in which the shuttle system 77 works is relatively simple. Material to be cut is laid out on top of the honeycomb panel 85 while the carriage 79 is still upstream from the cutting zone and preferably while material previously laid out upon a similar carriage is being cut in the cutting zone. With the material lying on the panel 85, the carriage 79 is rolled downstream along the tracks 81 into the cutting zone under the laser beam source (not shown), after which the cutting operation may be carried out on that piece of material. Such a system is particularly adapted to the cutting of materials other than garment fabric, i.e.: leather, corfam, rubber sheet, etc. where a fabric spreader is not practical or custom-made garments in which each garment is one of a kind, rather than being one of many similar garments, for which the system shown in FIG. 1 is better suited.

Basically, what has been described herein is a novel and superior technique for supporting and/or reinforcing relatively long or large honeycomb cores or panels whereby support members of non-honeycomb material extend into the "line of fire" of a focused laser beam without suffering damage and without causing damaging reflections of the laser beam.

It was also shown that the reinforcing technique of the present invention makes possible the creation of long and slender honeycomb slats which are rigid enough to permit the construction of a conveyor belt having substantial width combined with the ability to turn around a relatively small sprocket. When combined with a modified spreader of conventional construction the conveyor belt of the present invention was also shown capable of performing the spreading function in a superior manner. The invention has also been shown to be applicable to supporting a large panel which may be either stationary in the form of a table, or slidable in the form of a carriage shuttled back and forth along a set of rails into and out of the cutting zone of a laser cutting system.

What is claimed is:

1. A material handling system for a radiant energy cutter comprising in combination:
   a. a periodically advancing working surface for supporting and advancing material being cut by a focused beam of radiant energy directed toward said surface, said surface including:
      1. a plurality of slats, each including
         A. an elongate, heat conductive honeycomb core having an open top surface, a pair of long parallel sides and a pair of shorter ends; and
         B. a support member extending along and attached to, each of said sides, each support member having a tapered edge nearest said top surface;
      2. means operatively connected to said slat ends to connect said slats into an endless belt in which the support members of adjacent slats extend in closely spaced-apart parallel relationship, said support members being further characterized in that the included angle between the tapered edges of adjacent support members is sufficiently sharp to prevent reflection of said radiant energy back toward said working surface; and 3. means for periodically advancing said belt along a plane, the top surfaces of said slats in said plane forming said working surface;

b. means for supporting a bolt of said material rotatably near the upstream end of said surface;
c. means for guiding said material from said bolt onto said surface; and
d. means for turning said bolt periodically so as to dispense material from said bolt onto said surface at the same linear rate as that at which said surface advances.

* * * * *